United States Patent
Stagg

(10) Patent No.: US 8,174,384 B2
(45) Date of Patent: May 8, 2012

(54) METHOD AND SYSTEM FOR CONTROLLING READ RANGE OF A PORTABLE RFID READER

(75) Inventor: Adrian Joseph Stagg, Etobicoke (CA)

(73) Assignee: Psion Teklogix Inc., Mississauga (CA)

( * ) Notice: Subject to any disclaimer, the term of this patent is extended or adjusted under 35 U.S.C. 154(b) by 728 days.

(21) Appl. No.: 12/205,229

(22) Filed: Sep. 5, 2008

(65) Prior Publication Data

US 2010/0060420 A1    Mar. 11, 2010

(51) Int. Cl.
*G08B 13/14* (2006.01)
*H04B 1/38* (2006.01)

(52) U.S. Cl. ................................ 340/572.1; 455/574

(58) Field of Classification Search .................. 345/184; 340/10.1–10.5, 539.3, 572.1; 324/207; 455/574
See application file for complete search history.

(56) References Cited

U.S. PATENT DOCUMENTS

| | | | |
|---|---|---|---|
| 5,455,566 A * | 10/1995 | Conway | 340/573.1 |
| 6,707,376 B1 * | 3/2004 | Patterson et al. | 340/10.3 |
| 6,843,356 B2 * | 1/2005 | Oster | 192/215 |
| 7,066,388 B2 * | 6/2006 | He | 235/383 |
| 7,327,257 B2 * | 2/2008 | Posamentier | 340/572.1 |
| 2002/0170969 A1 * | 11/2002 | Bridgelall | 235/462.13 |
| 2003/0038774 A1 * | 2/2003 | Piot et al. | 345/156 |
| 2006/0176152 A1 * | 8/2006 | Wagner et al. | 340/10.2 |
| 2006/0238305 A1 * | 10/2006 | Loving et al. | 340/10.1 |
| 2006/0267733 A1 * | 11/2006 | Steinke et al. | 340/10.1 |
| 2007/0273481 A1 * | 11/2007 | Soleimani | 340/10.1 |
| 2008/0074260 A1 | 3/2008 | Reiner | |
| 2008/0106416 A1 | 5/2008 | Sullivan et al. | |
| 2009/0079711 A1 * | 3/2009 | Monney et al. | 345/184 |
| 2009/0295545 A1 * | 12/2009 | O'Haire et al. | 340/10.5 |
| 2011/0025311 A1 * | 2/2011 | Chauvin et al. | 324/207.25 |

* cited by examiner

*Primary Examiner* — Benjamin C Lee
*Assistant Examiner* — Sigmund Tang
(74) *Attorney, Agent, or Firm* — Pearne & Gordon LLP

(57) ABSTRACT

A method and system for controlling the read range of a portable RFID reader is provided. The system includes a trigger system including a mechanical actuator manually positionable by a user and a sensor for sensing the position of the actuator. The read range of the RFID reader is changed based on the sensing result.

16 Claims, 13 Drawing Sheets

METHOD AND SYSTEM FOR CONTROLLING READ RANGE OF A PORTABLE RFID READER

FIELD OF INVENTION

The present invention relates to data collection technology and, more particularly, to a method and system for mechanically controlling the read range of an RFID reader.

BACKGROUND OF THE INVENTION

Portable Radio Frequency-Identification (RFID) readers are often used to identify objects which have an RFID tag attached. The portable RFID readers offer advantages over traditional laser barcode scanners because they can identify many objects more or less simultaneously, and can also identify objects upon which the tag has been obscured from view. It is possible to identify objects more rapidly using a portable RFID reader in place of a laser barcode scanner because the operator does not have to spend time accurately aiming the device.

However, if the operator of the RFID reader needs to read only a tag attached to a specific object, it is required to adjust the read range of the RFID reader. Reducing the read range can allow the reader to read a tag attached to an object from a short read range so that only the object directly in front of the portable RFID reader's antenna is read. It is possible to control the read range of the RFID reader by, for example, reducing or increasing the power of the RF field. This is usually achieved by interacting with a device for controlling the RFID reader in a time consuming way, such as selecting actions from a menu using a touch screen, or using a keypad on the device to change the configuration. Such an interruption to the work flow is frustrating to the operator of the device, and wastes valuable time. Thus, there is a demand from consumers to be able to easily switch between a long range operation and a short range operation.

Operating a portable RFID reader at a short range has problems associated with it in that the ability to read an RFID tag is effected by the object to which the tag is attached. If the RFID tag is attached to an object that has a high liquid content, then the RF field is absorbed. If the RFID tag is attached to an object with a high metal content, the RF field is reflected, which causes distortions and fading of the RF signal. Both of these effects make it more difficult to read the RFID tag. Different amounts of RF power are therefore required to read similar RFID rags at the same range, depending on the type of object they are attached to. If an operator is required to read a number of RFID tags, each fixed to an object of a different metal or water content, but read each tag individually, the operator may spend a large amount of time re-configuring the RF output power of the device, rather than reading tags.

Therefore, there is a need for a handheld terminal that allows a user to easily control the read range of an RFID reader while the user operates the RFID reader.

SUMMARY OF THE INVENTION

It is an object of the invention to provide a method and system that obviates or mitigates at least one of the disadvantages of existing systems.

In accordance with an aspect of the present invention there is provided a trigger system for operating an RFID reader, which includes a mechanical actuator movably engaged with a portable housing for the RFID reader and manually movable by a user, and a sensor system for sensing the movement of the actuator to change the read range of the RFID reader based on the position of the actuator.

In accordance with another aspect of the present invention there is provided a portable terminal for an RFID operation, which includes a housing for enclosing the RFID reader. The housing includes a handle hold by a user. The portable terminal further includes a mechanical actuator movably engaged with the handle and manually movable by the user, and a read range control system for controlling the read range of the RFID reader based on the position of the actuator.

In accordance with a further aspect of the present invention there is provided a portable terminal for an RFID operation, which includes an RFID reader for reading an RFID tag, a trigger system for operating the read range of the RFID reader, and a housing for enclosing the RFID reader and the trigger system. The housing includes a handle hold by a user. The trigger system includes a mechanical actuator manually movable by the user holding the handle, and a sensor system for sensing the position of the actuator to change the read range of the RFID reader based on the position of the actuator.

In accordance with a further aspect of the present invention there is provided a method for RFID operation. The method includes sensing a position of a movable mechanical actuator. The actuator is manually locatable in a plurality of positions defined by a housing of a portable RFID reader. The method includes changing the read range of the RFID reader based on the position of the actuator.

BRIEF DESCRIPTION OF THE DRAWINGS

These and other features of the invention will become more apparent from the following description in which reference is made to the appended drawings wherein.

DETAILED DESCRIPTION

Figure 1:
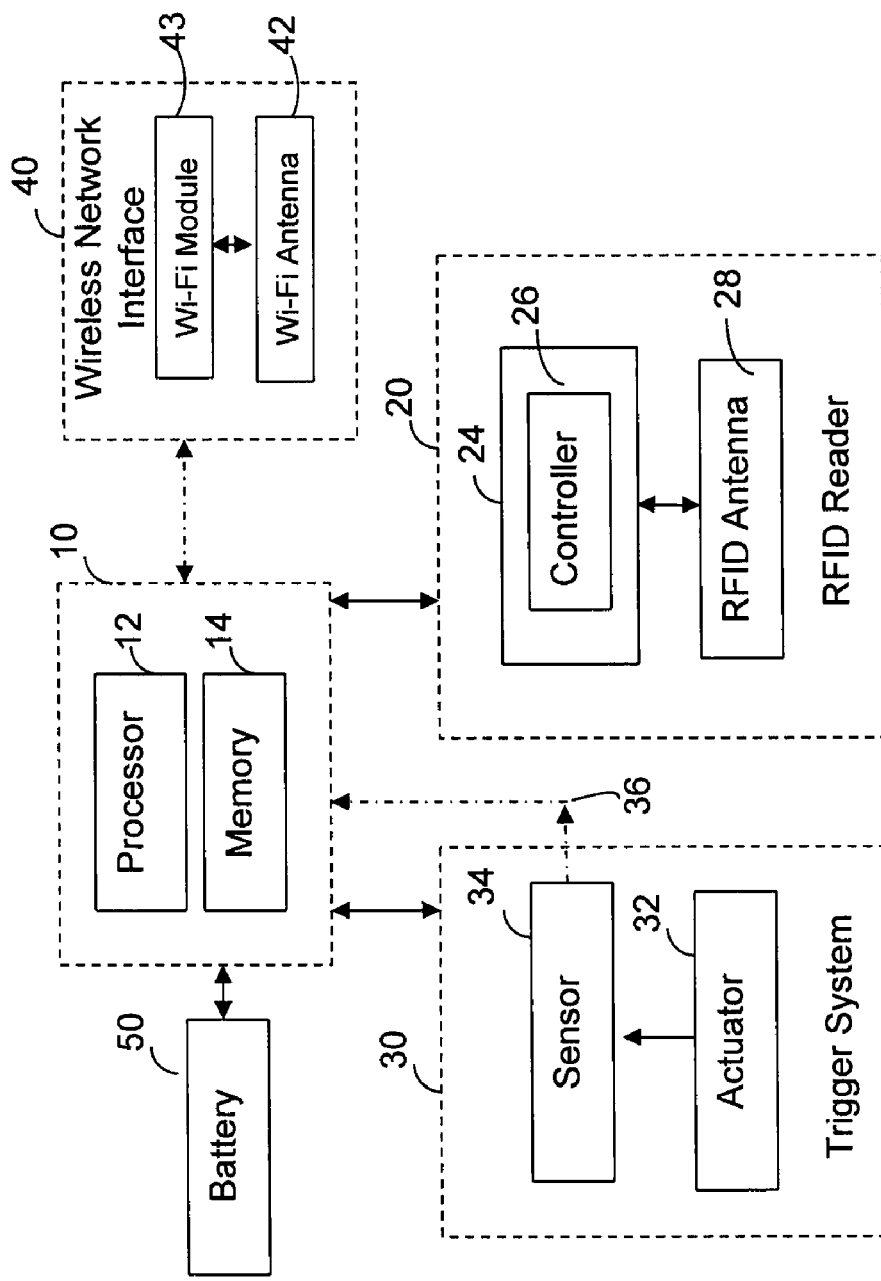
FIG. 1 illustrates a portable RFID reader terminal in accordance with an embodiment of the present invention.

Referring to FIG. 1, there is illustrated a portable RFID reader terminal in accordance with an embodiment of the present invention. The portable RFID reader terminal 100 of FIG. 1 includes an RFID reader 20, a trigger system 30 for controlling the read range of the RFID reader 20, and a rechargeable battery 50 for supplying power for the operations of the terminal 100. The portable RFID reader terminal 100 is a handheld device. The portable RFID reader terminal 100 has a handle that forms a pistol grip, as described in detail below. The handle of the RFID reader terminal 100 is configured so that the user can hold the RFID reader terminal 100 in his/her hand and manually operate the trigger system 30.

In the description, the terms "portable" and "handheld" may be used interchangeably. In the description, the terms "user" and "operator" are used interchangeably. In the description, the terms "handle" and "pistol grip" may be used interchangeably.

Figure 2:
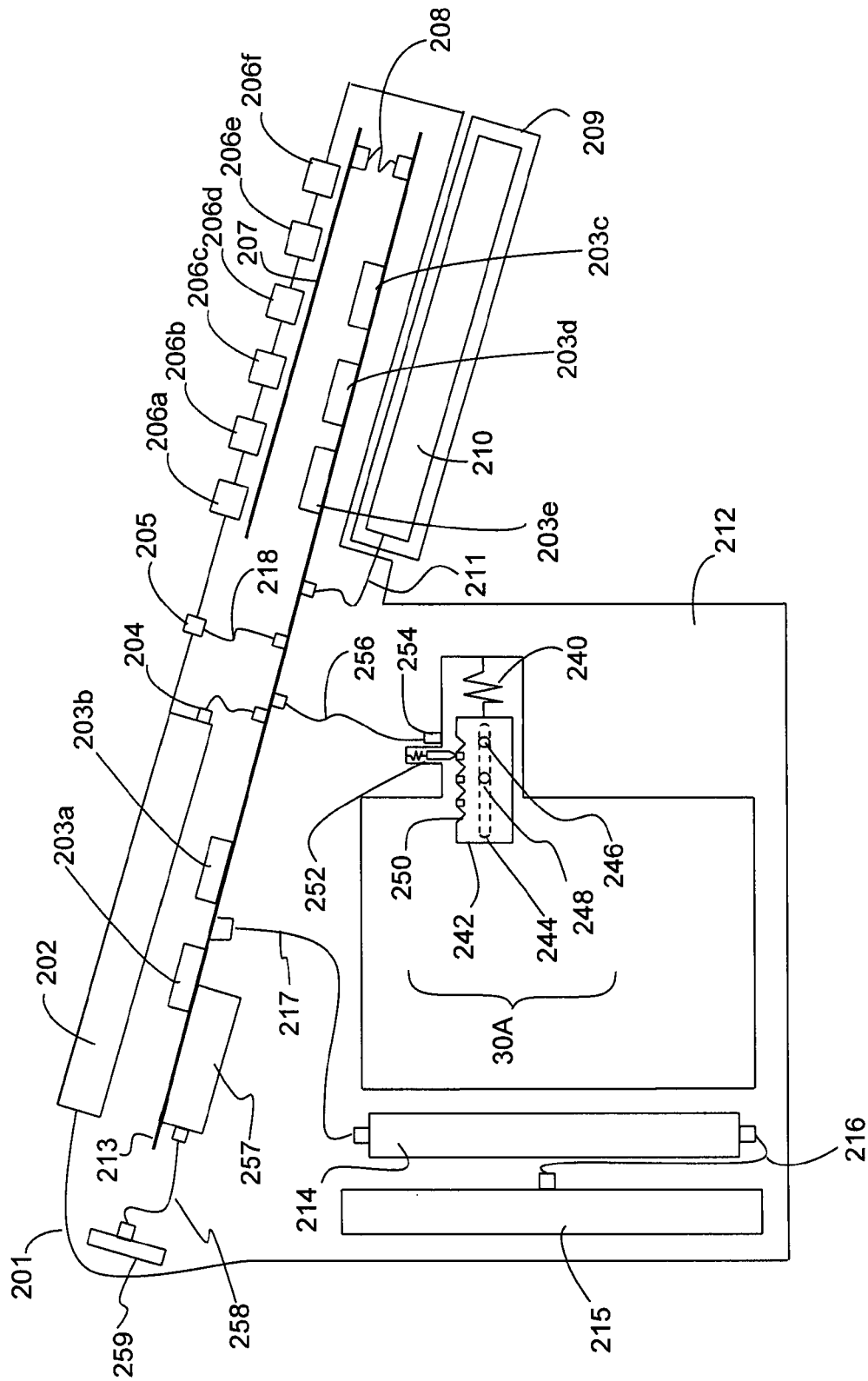
FIG. 2 illustrates a cross section view of an example of the portable RFID reader terminal of FIG. 1.

The RFID reader terminal 100 includes a main Printed Circuit Board (PCB) (e.g., 213 of FIG. 2). The main PCB includes a processor 12 for operating the RFID reader terminal 100, including operating the RFID reader 20 (e.g., activation/deactivation of RFID functionality). The RFID reader terminal 100 includes a wireless network interface module 40 for communications with an external wireless network. The interface module 40 includes, for example, a wireless network interface module 43, where said wireless network may be a Wi-Fi network, and an antenna 42, for sending and receiving RF signals to/from the wireless network.

The trigger system 30 is a dual or multi-position trigger whose position is determined mechanically, and provides a tactile feedback to a user who operates the trigger system 30. When the user operates the trigger system 30, the user receives tactile reaction or tactile feedback from the trigger system 30 so that the user can interpret different phases of a continuous movement. Through the tactile feedback, the user can estimate the read range to expect, and control the device 10 more effectively and skillfully based on this knowledge.

The trigger system 30 includes a mechanical actuator 32 and a position sensor 34 for sensing the position of the actuator 32. The position of the actuator 32 is changed through its mechanical movement. The actuator 32 is manually operated by a user. The position sensor 34 senses the position of the actuator 32 and outputs the sensing result 36 to the processor 12, so that the processor 12 can communicate with the RFID reader 20, and instruct the RFID reader to adjust the read range.

The RFID reader 20 reads information from RFID tags. The information read from the RFID tags could be provided to an external device, such as a server, through the wireless network interface module 40. The information read from the RFID tags may be stored in a memory 14 in the terminal for later retrieval. The RFID reader 20 may be, for example, but not limited to, a High Frequency (HF) RFID reader or a Ultra High Frequency (UHF) RFID reader. The RFID reader 20 may be an RFID reader/writer. In the description, "RF signal" and "RF output" may be used interchangeably.

The RFID reader 20 includes circuitry 24 for RFID operations and an RFID antenna 28. The circuitry 24 includes an RFID reader controller 26 for controlling the RFID reader's operation, including controlling the read range of the RFID reader 20, based on one or more commands received from the processor 12, which were generated by the processor 12 based on the sensing result 36 output from the position sensor 34 and sent to the RFID reader 20. The RFID reader controller 26 also allows for communication with the processor 12 which is part of the main PCB of the RFID reader terminal 100.

In one example, the RFID reader controller 26 controls the level of attenuation of the RF output, based on the output 36 from the position sensor 34, after this output 36 has been interpreted by the processor 12, and commands have been sent from the processor 12 to the RFID reader controller 26. In another example, the RFID reader controller 26 controls the amount of power supplied to an RF power amplifier for the RF antenna, based on the output 36 from the position sensor 34 after this output 36 has been interpreted by the processor 12, and commands have been sent from the processor 12 to the RFID reader controller 26. The amount of power or attenuation may be controlled in a continuous fashion or a discrete fashion.

For example, the trigger system 30 enables the RFID reader 20 to operate at low output power when the actuator 32 is positioned in a first position; the trigger system 30 enables the RFID reader 20 to operate at middle output power when it is in a second position; and the trigger system 30 enables the RFID reader 20 to operate at high output power when it is in a third position.

Using the trigger system 30, the portable RFID reader terminal 100 is capable of using the minimum amount of RF output power required to read an RFID tag at the required range. For example, UHF RFID readers use a large amount of power when operated at maximum range. However, using the trigger system 30, the RFID reader only uses the minimum amount of RF output power to read the tag or tags which need to be read. The RFID reader 20 does not have to always transmit at maximum power since the output power is controlled. Thus, the battery life (50) of the portable RFID reader terminal 100 will be extended. Densely packed tags can be more accurately and easily read by easily operating the RFID reader 20 at low power.

One of ordinary skill in the art could appreciate that the portable RFID reader terminal 100 may include one or more components other than those illustrated in FIG. 1. The portable RFID reader terminal 100 may include one or more user interface components (e.g., display, keyboard, visual/sound devices). The portable RFID reader terminal 100 may include one or more indicators (e.g., a visual indicator, a sound indicator), such as an indicator for indicating the read range of the RFID reader 20. The processor 12 may operate the user interface components and the indicators. One of ordinary skill in the art would appreciate that the RFID reader 20 may include one or more components other than those illustrated in FIG. 1.

Referring to FIG. 2, one example of the portable RFID reader terminal 100 of FIG. 1 is described in detail. The portable RFID reader terminal 100A of FIG. 2 includes a housing 201 having a handle 212. The handle 212 forms a pistol grip. The handle 212 is held in the hand of an operator when the operator manually operates the portable RFID reader terminal 100A. In FIG. 2, the handle 212 is part of the housing 201 and is integrated into the housing 201. However, the handle 212 may be detachably engaged with the housing 201.

The portable RFID reader terminal 100A includes a display 202. The display 202 is located on the top side of the housing 201. The display 202 is connected to the main PCB 213 through a connection 204.

The portable RFID reader terminal 100A includes one or more components that are fitted on the main PCB 213. The components fitted on the main PCB 213 may include, for example, but not limited to, processors, power supply ICs, display controller, etc. In FIG. 2, "203a", "203b", "203c", "203d", and "203e" are shown as an example of the components.

The portable RFID reader terminal 100A includes a wireless network interface module 257, which may also be fitted to the main PCB 213. This wireless interface module 257 is connected to a wireless network antenna 259 through a connection 258. The wireless interface module 257 corresponds to the wireless interface module 43 of FIG. 1, the wireless network antenna 259 corresponds to the antenna 42 of FIG. 1. The combination of the wireless network module 257 and the wireless network antenna 259 and the connection 258 correspond to the wireless network interface 40 of FIG. 1.

The portable RFID reader terminal 100A includes an indicator 205 for indicating the read range of the RFID reader. The indicator 205 is located on the top side of the housing 201. The indicator 205 is connected to the main PCB 213 through a connection 218.

The portable RFID reader terminal 100A includes a plurality of keys and a keypad PCB 207. The keys are located on the top side of the housing 201. In FIG. 2, "206a", "206b", "206c", "206d", "206e", and "206f" are shown as an example of the keys. The keypad PCB 207 is connected to the main PCB 213 through a connection 208.

The portable RFID reader terminal 100A includes a battery housing 209 for a battery cell 210. The battery cell 210 corresponds to the battery 50 of FIG. 1. The battery cell 210 is connected to the main PCB 213 through a connection 211.

The portable RFID reader terminal 100A includes an RFID reader module 214 and an RFID antenna 215. The RFID reader module 214 corresponds to the RFID reader 20 of FIG. 1. The RFID antenna 215 corresponds to the RFID antenna 28 of FIG. 1. The RFID reader module 214 is connected to the RFID antenna 215 through a connection 216. The RFID reader module 214 is connected to the main PCB 213 through a connection 217.

The portable RFID reader terminal 100A includes a trigger system 30A. The trigger system 30A is fitted on the handle 212. The trigger system 30A is one example of the trigger system 30 of FIG. 1. The trigger system 30A includes mechanism for encoding the position of the actuator 242 and providing a tactile feedback to a user, as described below.

The trigger system 30A includes a spring 240, an actuator 242 having a slot 244 and a notch portion 250, supports 246 and 248, a spring loaded latch 252, a hall effect sensor 254, and a connector 256 between the hall effect sensor 254 and the main PCB 213. The actuator 242 corresponds to the actuator 32 of FIG. 1. The sensor 254 corresponds to the sensor 34 of FIG. 1. The actuator 242 is supported by one or more supporters. In FIG. 2, two supports 246 and 248 are illustrated as an example of the one or more supporters. The notch portion 250 includes a plurality of notches.

The shapes of the housing 201, the handle 212 and other components in FIG. 2 are representational only, and do not necessarily reflect the actual shapes of those elements, and each element may have a different shape. The shape may be determined by considering ergonomic factors and system requirements. In the description, the terms "connected", "engaged" and "linked" may be used interchangeably. In the description, the terms "connector" and "connection" may be used interchangeably.

Figure 3:
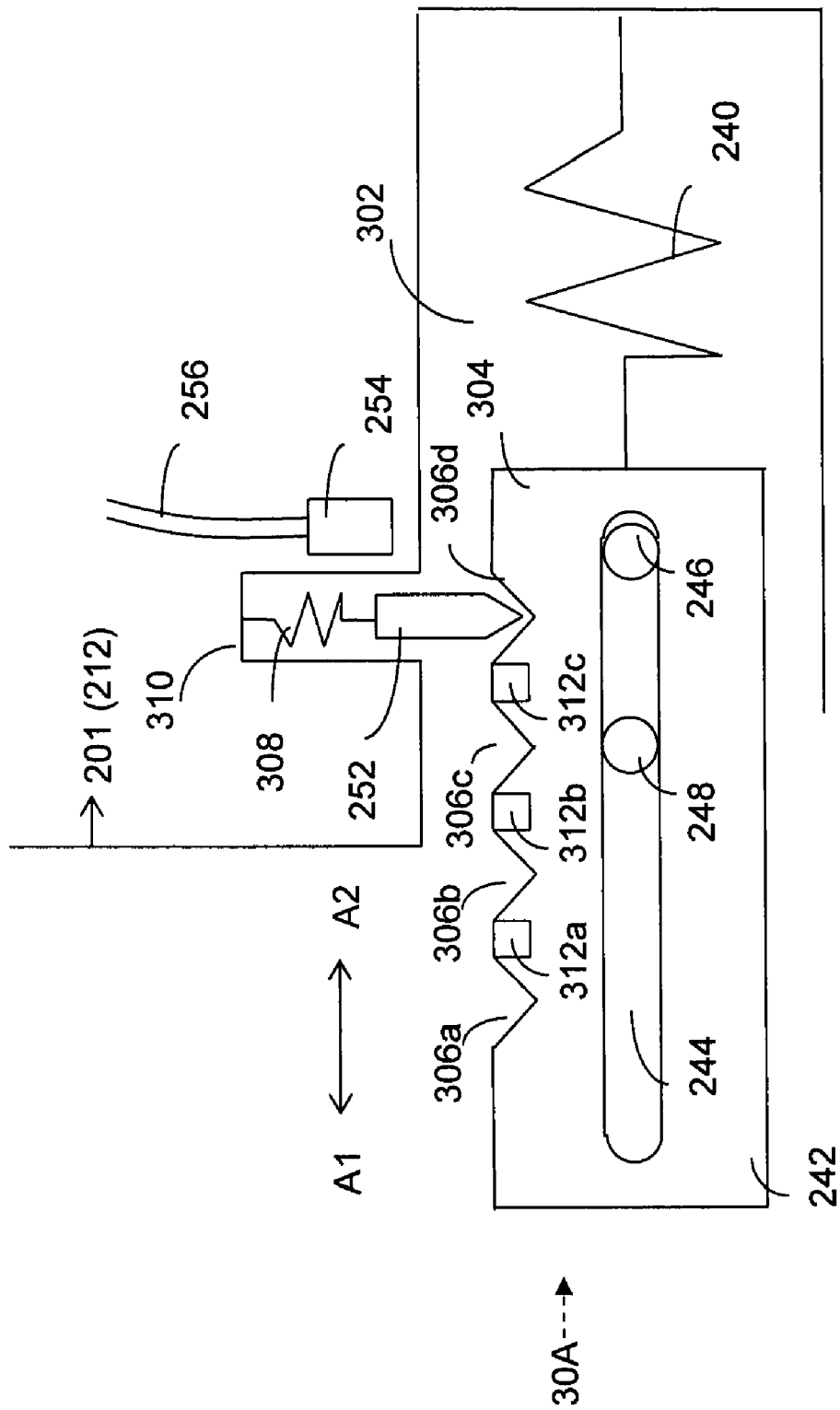
FIG. 3 illustrates a cross sectional side view of a trigger system of FIG. 2 in which an actuator is located in its original position.
Figure 4:
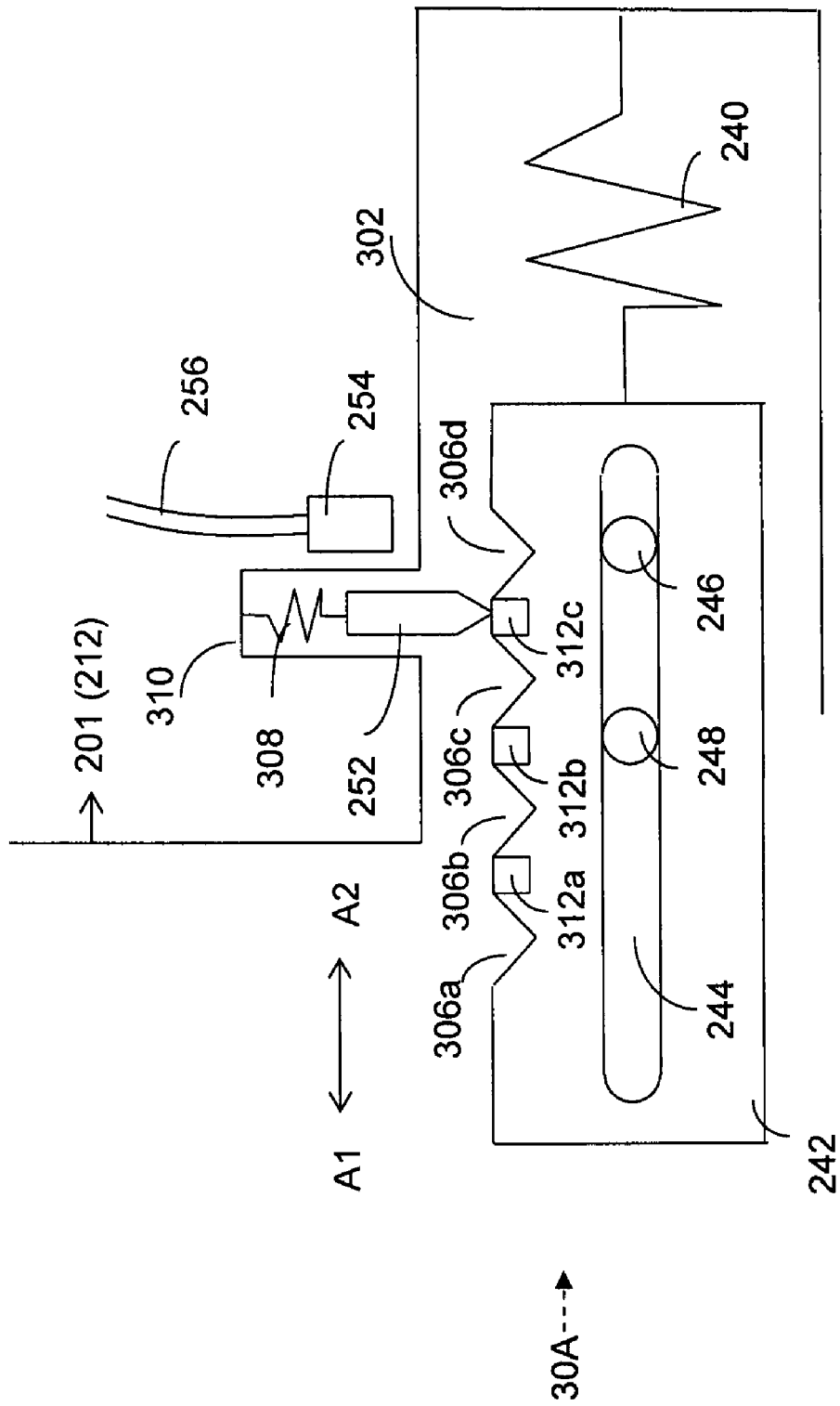
FIG. 4 illustrates another cross sectional side view of the trigger system of FIG. 2 in which the actuator is located in a first position.
Figure 5:
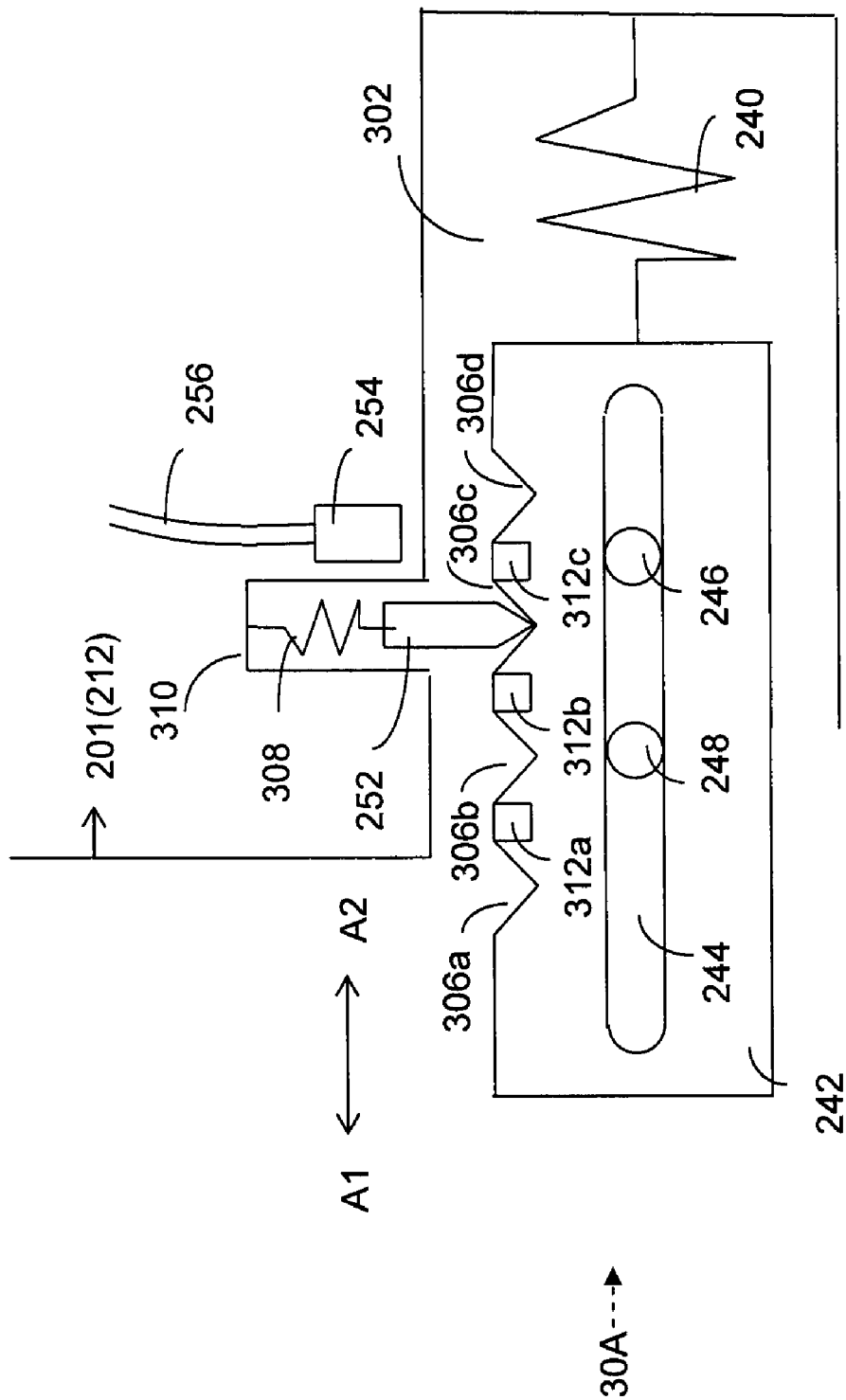
FIG. 5 illustrates a further cross sectional side view of the trigger system of FIG. 2 in which the actuator is located in a second position.
Figure 6:
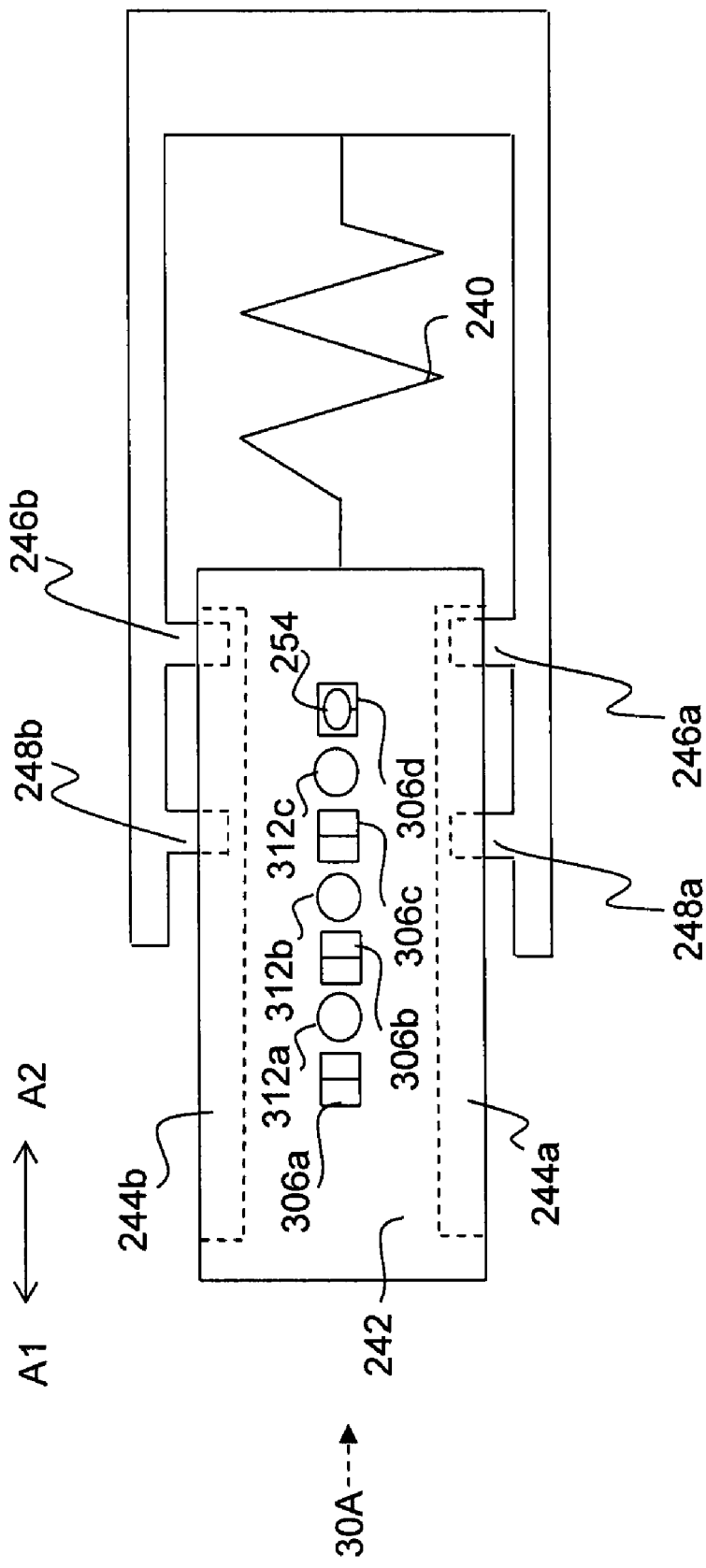
FIG. 6 illustrates a cross sectional top view of the trigger system of FIG. 2 in which the actuator is located in the original position.
Figure 7:
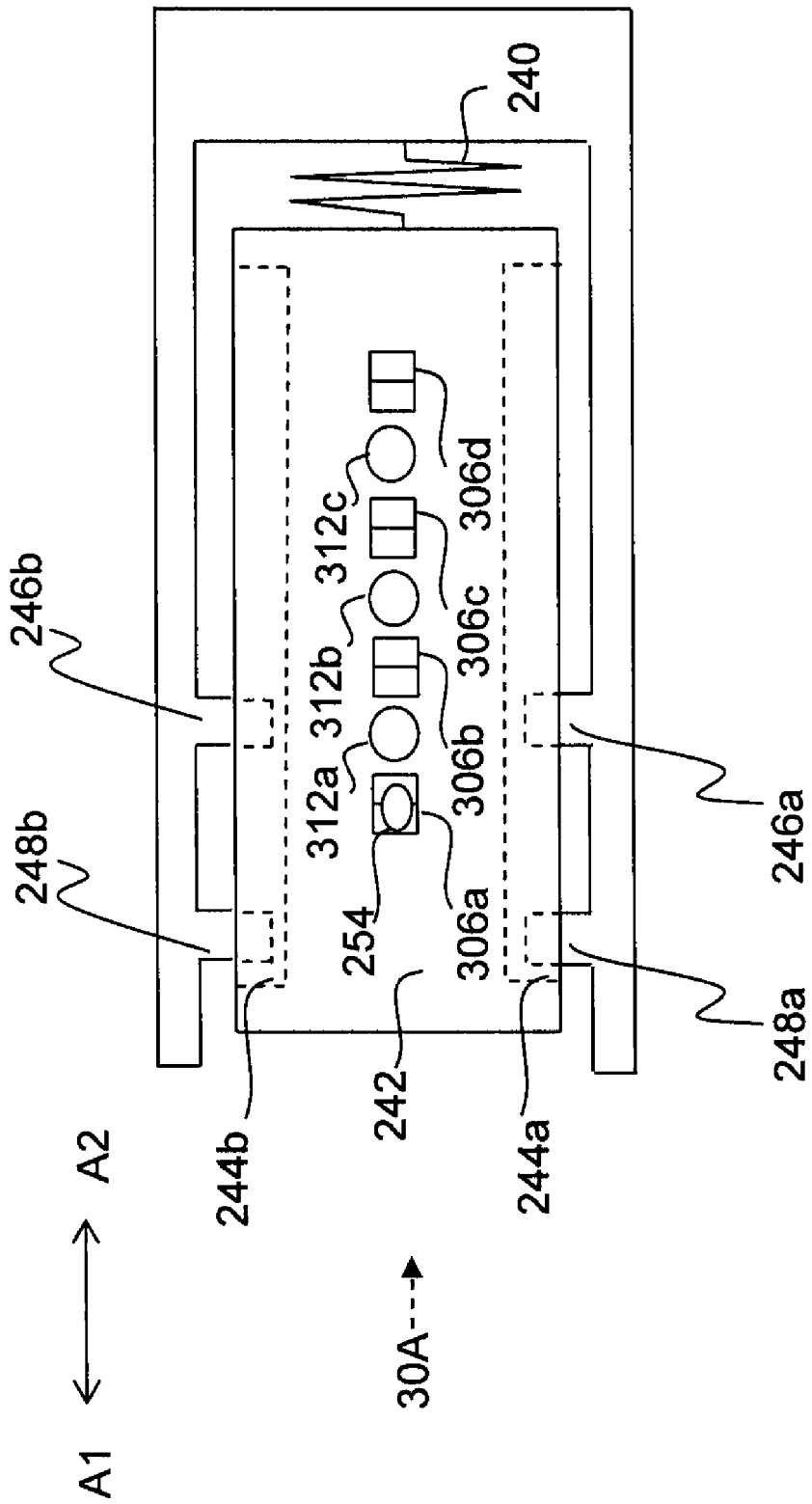
FIG. 7 illustrates another cross sectional top view of the trigger system of FIG. 2 in which the actuator is fully inserted.

The trigger system 30A of FIG. 2 is described in detail with reference to FIGS. 3-7. FIGS. 3-5 illustrate side views of the trigger system 30A. FIGS. 6-7 illustrate top views of the trigger system 30A. In FIGS. 3 and 6, the trigger system 30A is in its original (rest) position. In each of FIGS. 4-5 and 7, the actuator 242 is located in a position different from the original position.

The housing 201 (handle 212) has a recess (space) 302 for accepting the actuator 242. The supporters 246 and 248 are part of (or engaged with) the housing 201 as shown in FIGS. 6-7. The supporters 246 and 248 are fit into the slot 244. The actuator 242 slides on the supporters 246 and 248 and moves along a slide path defined by the slot 244. The actuator 242 is movable along the slide path in direction A1 and opposite direction A2 along the slide path.

The movement of the actuator 242 is limited by the slot 244 on the actuator 242 interacting with the supports 246 and 248. As shown in FIGS. 6-7, the supports 246 and 248 are part of the housing 201, and thus do not move when the actuator 242 moves. In FIGS. 6-7, two slots 244a and 244b are shown. Each of the slots 244a and 244b correspond to the slot 244 of FIGS. 3-5. In FIGS. 7-6, four supports 246a, 246b, 248a, and 248b are illustrated. Each of the supports 246a and 246b corresponds to the support 246 of FIGS. 3-5. Each of the supports 248a and 248b corresponds to the support 248 of FIGS. 3-5. In FIG. 6, the actuator 242 is in the original position where the slots 244a and 244b and the supports 246a and 246b prevent the actuator 242 from further moving toward the direction A1. In FIG. 7, the actuator 242 is fully inserted where the slots 244a and 244b and the supports 248a and 248b prevent the actuator 242 from further moving toward the direction A2.

The head 304 of the actuator 242 is connected to one end of the spring 240. The other end of the spring 240 is connected to the recess 302. The spring 240 provides resistance to the actuator 242 being pushed backwards (direction A1), and returns the actuator 242 to the original position when the operator releases the actuator 242.

The notch portion (250 of FIG. 2) includes a plurality of notches. In FIGS. 3-7, notices 306a, 306b, 306c, and 306d are illustrated as an example of the notices in the notch portion. The notices 306a, 306b, 306c, and 306d are formed in the outer surface of the actuator 242. The notches 306a-306d are designed to receive the spring loaded latch 252.

One end of the spring loaded latch 252 is attached to one end of a spring 308. The other end of the spring 308 is engaged with a recess 310 formed in the housing 201 (handle 212). The spring loaded latch 252 is releasably latched in one of the notches 306a-306d. The actuator 242 is latched at a certain position along the slide path by the spring loaded latch 252 and one of notches 306a-306d.

When the spring loaded latch 252 is pushed into the notch, tactile feedback is provided to the operator, for example, in the form of a tactile "click", indicating that the RFID read range is changed from the current level to another level.

When the actuator 242 is released from the notch 306a, 306b or 306c, the spring 240 returns the actuator 242 to the rest position and the tactical feedback is provided to the user.

A plurality of magnets 312a, 312b, and 312c are aligned in between the notches 306a-306d. The hall effect sensor 254 senses the position of the actuator 242 using the magnets 312a-312c. The sensing result from the hall effect sensor 254 is transferred to the processor (12 of FIG. 1) through one or more than one connection 256, and then commands are sent to the RFID reader controller (26 of FIG. 1). The output from the hall effect sensor 254 varies based on changes in a magnetic field density. The hall effect sensor 254 outputs a voltage depending on the magnetic field density when the target magnet (e.g., 312a, 312b, 312c) pass in front of the hall effect sensor 254.

For example, when the actuator 242 moves toward the direction A2, the magnets 312c, 312b..., pass the field of the hall effect sensor 254, and the hall effect sensor 254 produces outputs on the connection 256, which is interfaced to the processor (12 of FIG. 1). The hall effect sensor 254 produces an output pulse as each magnet passes beneath it, and these pulses are counted by the processor (12) so that the position can be known, and commands can be sent to the RFID reader controller (26). In this example, the processor (12) includes a counter for counting the pulses. In another example, the hall effect sensor 254 may be connected to the RFID reader controller (26) and the RFID reader controller (26) may include a counter for counting the pulses, and may control the read range of the RFID reader directly without interaction from the processor (12).

In FIG. 3, the spring loaded latch 252 is in the notch 306d and thus the hall effect sensor 254 has no magnet creating an output from the sensor 254, this is the original (rest) position. The actuator 242 moves toward the direction A2 when the operator pushes the actuator 242 toward the direction A2. The actuator 242 cannot move toward the direction A1 as the slot 244 and the support 246 stop the movement of the actuator 242 toward the direction A1.

When the actuator 242 is pushed towards the direction A2 from the original position, the spring loaded latch 252 is released from the notch 306d and is pushed into the recess 310, as shown in FIG. 4. In FIG. 4, the sensor 254 is in the field of the magnet 312c, and thus an output is created by the sensor 254.

When the operator further pushes the actuator 242 toward the direction A2, the spring loaded latch 252 is pushed into the next notch 306c, as shown in FIG. 5. As the actuator 242 is moved further in direction A2, the magnet 312c will cease to create an output from the sensor 254.

When the actuator 242 is further pushed, the magnet 312b will create an output from the sensor 254, and the processor (12 of FIG. 1) will count two pulses, and then three as magnet 312a lines up with the sensor 254.

When the actuator 242 is released from the notch 306a, there will be three rapid pulses followed by no output from the sensor 254. The processor (12) sends commands to the RFID reader controller (26) to turn off the RFID reader when the actuator 242 returns to the rest position and there is no longer any output from the sensor 254.

No output is generated by the sensor 254 when the actuator 242 is in the rest position. The RFID processor (12 of FIG. 1) does not need to know the position of the actuator 242, as it only counts the pulses from the sensor 254. For example, after one pulse it would enable the RFID reader (20 of FIG. 2) at minimum power, after another pulse, medium power, and after a third pulse maximum power.

In FIGS. 3-5, two supporters 248 and 246, four notches 306a-306b and three magnets 312a-312c are shown. However, the number of these elements may vary depending on the system design and requirement. In FIGS. 3-7, the notch has a v-shaped cross section. However, the shape of the notch may be different from that of FIGS. 3-7. The shape of the notch may be determined depending upon the shape of the spring loaded latch 252. In FIGS. 3-7, one spring loaded latch 252 and its associated spring 308 are shown. However, the trigger system 30A may include more than one spring loaded latch and their associated springs.

The trigger system 30A of FIGS. 2-7 uses the magnets 312a-312c and the hall effect sensor 254 for sensing the position of the actuator. However, the trigger's position may be sensed in a plurality of ways. The position sensing may be implemented by, for example, but not limited, a mechanical switch or switches, or a variable resistance.

Figure 8:
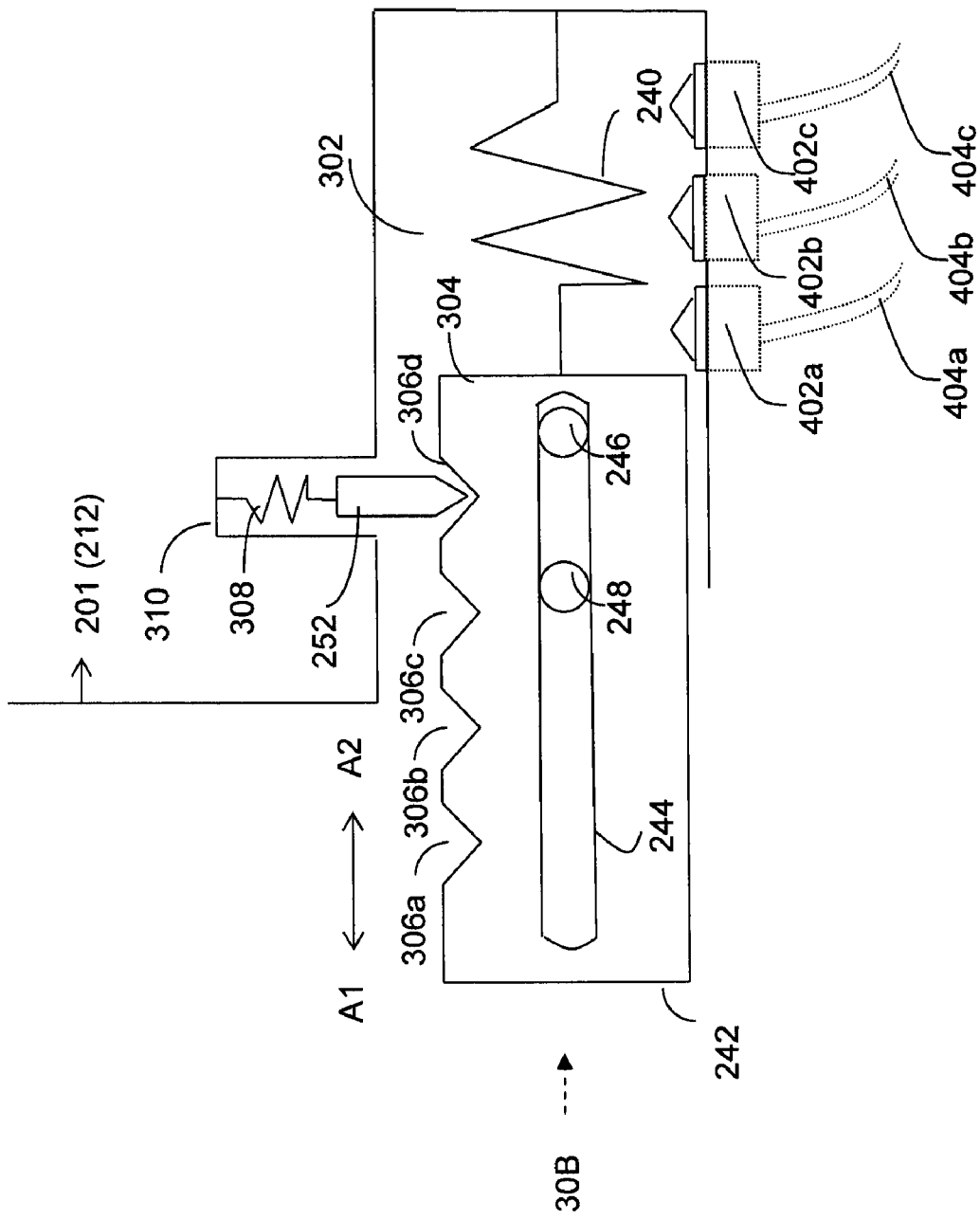
FIG. 8 illustrates a cross sectional view of another example of the trigger system applied to the terminal of FIG. 1 in which an actuator is located in the original position.
Figure 9:
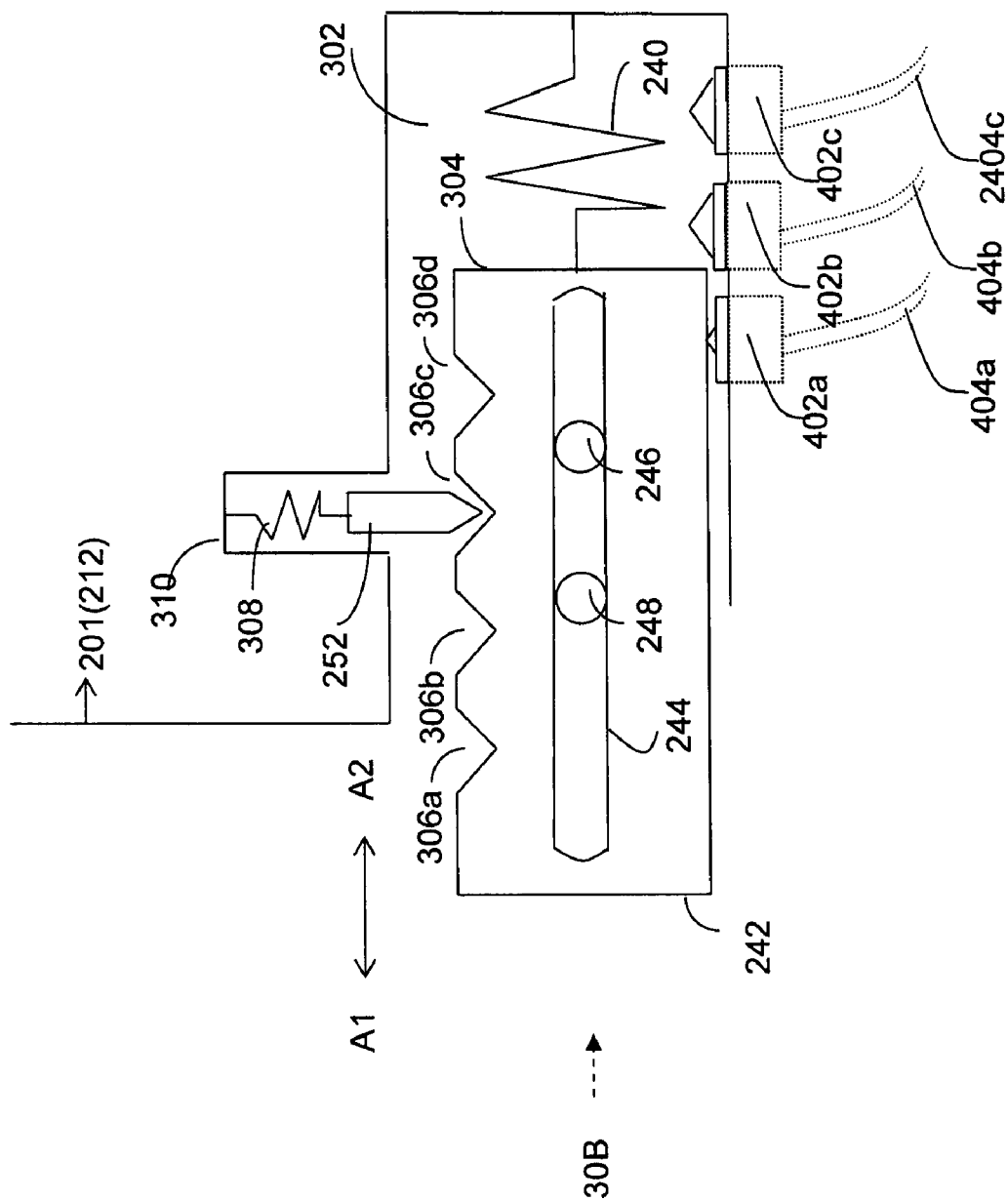
FIG. 9 illustrates another cross sectional view of the trigger system of FIG. 8 in which the actuator is located in the second position.
Figure 10:
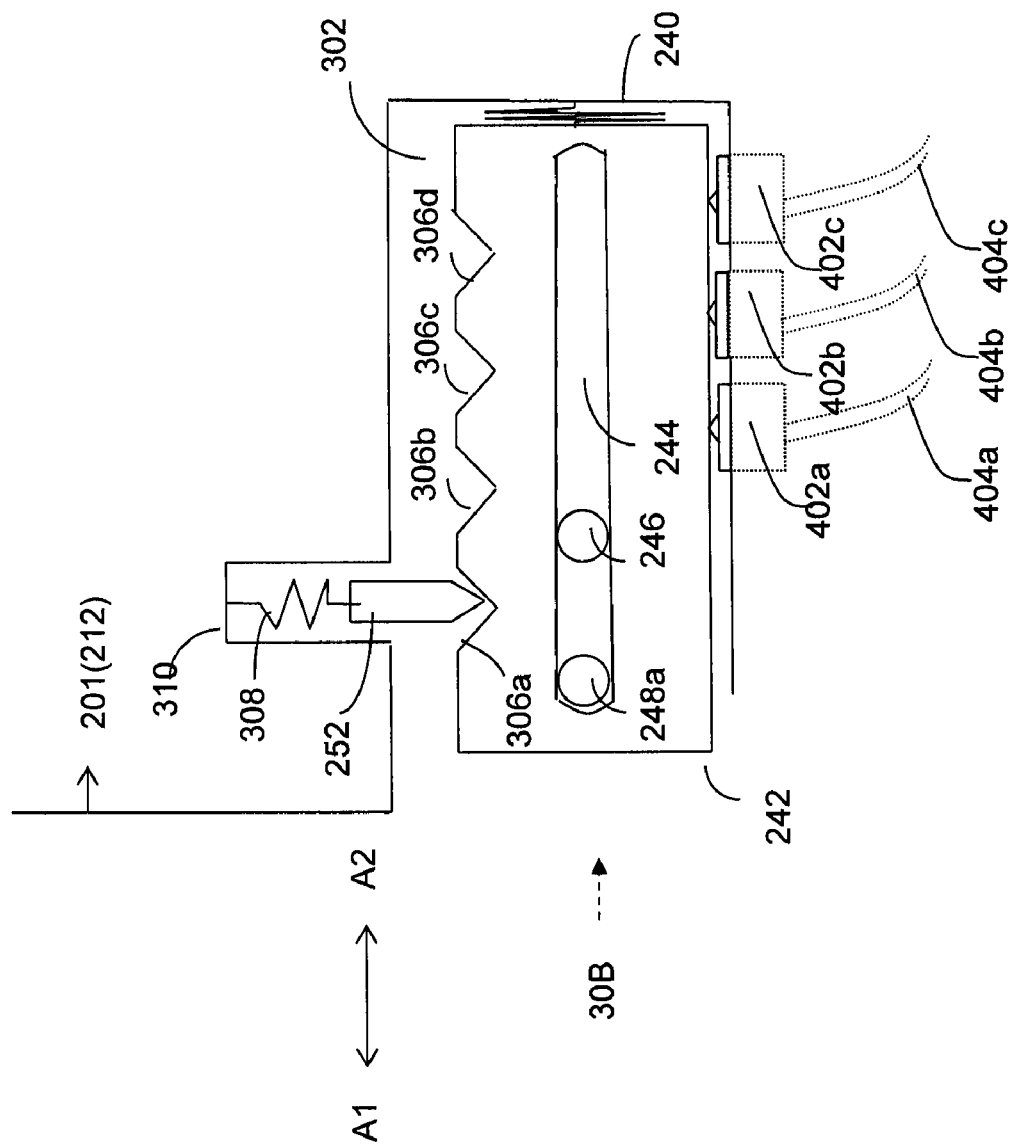
FIG. 10 illustrates a further cross sectional view of the trigger system of FIG. 8 in which the actuator is fully inserted.

Referring to FIGS. 8-10, another example of the trigger system 30 of FIG. 1 is described in detail. The trigger system 30B of FIGS. 8-10 includes an encoder using one or more mechanical switches for encoding the position of the actuator. In FIGS. 8-10, three detector switches 402a, 402b and 402c are shown as an example of the one or more mechanical switches. The detector switches 402a, 402b and 402c are connected to the RFID processor (e.g., 12 of FIG. 1) through connections 404a-404c.

In FIG. 8, the actuator 242 is in the rest position. The spring loaded latch 252 is in the notch 306d. The detector switches 402a, 402a and 402c are in their original state.

In FIG. 9, the actuator 242 has been pushed back toward the direction A2, and as a result, the spring loaded latch 252 is in the notch 306c. The switch 402a has been depressed so that the switch 402a is now closed, indicating to the processor (12 of FIG. 1) that the actuator 242 is moved to another position, and the RFID reader is to be activated, for example, at minimum power.

In FIG. 10, the actuator 242 is in the fully inserted position. The switches 402a, 402b and 402c are all depressed so that all three switches 402a, 402b and 402c are closed, indicating to the processor (12 of FIG. 1) that the actuator 242 is fully inserted, and that the RF signal is now to be transmitted, for example, at maximum power.

Figure 11:
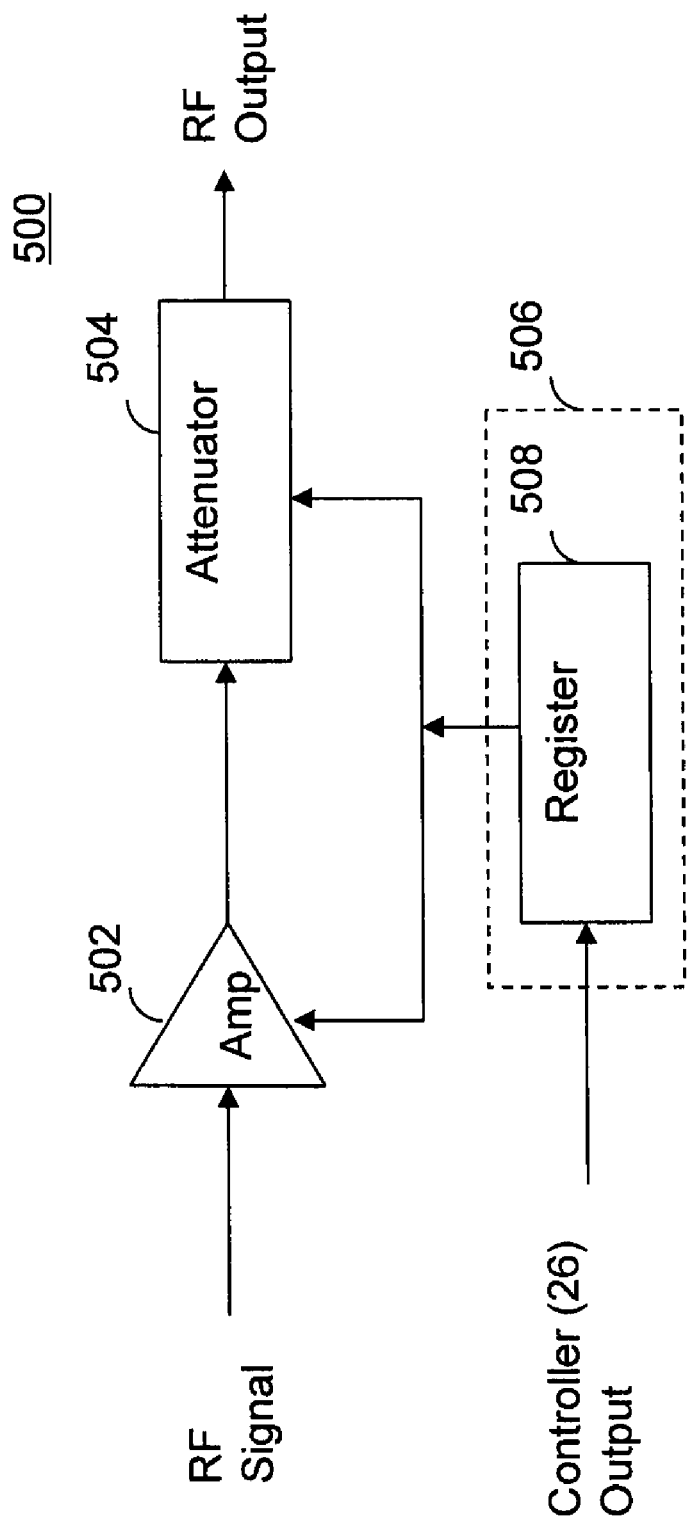
FIG. 11 illustrates an example of an RF output module associated with RF output power and located in an RF antenna module of FIG. 1.

Referring to FIG. 11, there is illustrated an example of an RF output module associated with RF output power. The RF output module 500 of FIG. 11 is part of the circuitry for RFID operations (24 of FIG. 1) The RF output module 500 includes an RF power amplifier 502, an attenuator 504, and a regulator 506 having a register 508. The register 508 may be, but not limited to, a 8 bit register. The controller 26 of FIG. 1 sets the values of the register 508.

One of ordinary skill in the art would appreciate that the circuitry for RFID operations (24) and the RF output module 500 include components other than those of FIG. 11.

In one example, the RFID reader controller 26 of FIG. 1 controls the level of attenuation of the RF output, based on commands from the processor 12 of FIG. 1, which are derived from the output from the position sensor 34 of FIG. 1. The controller 26 operates on the resister 508 based on the output from the position sensor 34 so that the register 508 represents the level of attenuation (504).

In another example, the RFID reader controller 26 of FIG. 1 controls the amount of power supplied to the RF power amplifier 502, based on commands from the processor 12 of FIG. 1, which are derived from the output from the position sensor 34 of FIG. 1. In a further example, the register 508 is used to control the voltage that is supplied to the RF power amplifier 502 or to an analog control pin which controls the amount of RF output power on the RF power amplifier 502, after the contents of the register 508 have been converted to an analog voltage by a Digital to Analog converter, hence providing some control over the level of RF output generated.

The RFID reader 20 of FIG. 1 may be a UHF RFID reader. The UHF RFID reader (20) may have a maximum power output of 1 W (30 dBm), and a maximum attenuation of 15 dBm. In this case, the output of the UHF RFID reader can be set to a range of values between 15 dBm and 30 dBm. The power is, for example, set in 1 dB increments. The level of attenuation is, for example, set to a value between 0 and 255 using 8 bit register 508.

A digitally controlled attenuator is generally a more accurate method of controlling the output power. The attenuator 504 may include a digitally controlled attenuator. The attenuator 504 may be a digital attenuator that has a plurality of operation modes selected by the output from register 508. The operation modes include, for example, attenuation "on", attenuation "off", and different levels of attenuation.

The attenuator 504 may include, for example, but not limited to, a Pi attenuator, Tee attenuator, Bridged T attenuator, a voltage variable attenuator, or combinations of several attenuator elements.

Figure 12:
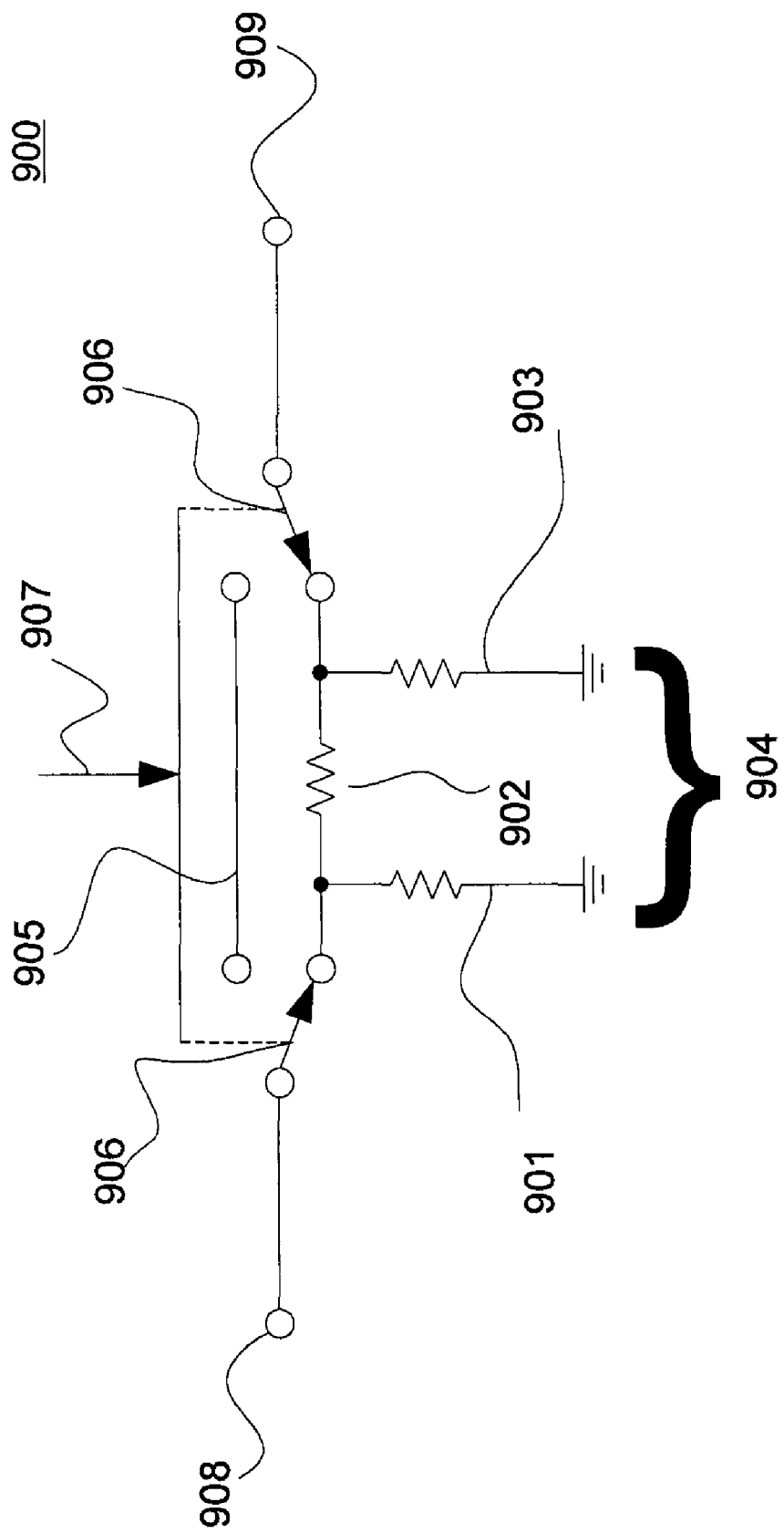
FIG. 12 illustrates an example of an attenuator of FIG. 11.
Figure 13:
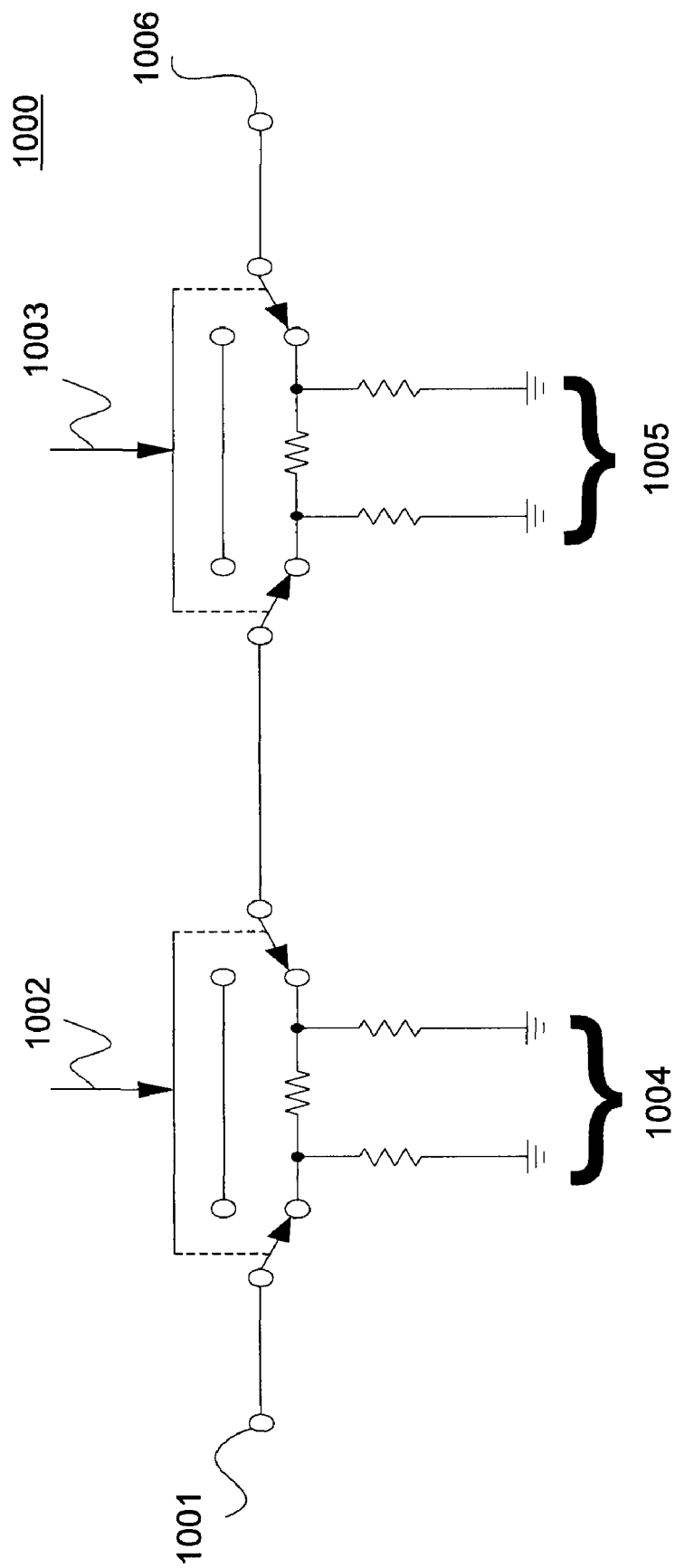
FIG. 13 illustrates another example of the attenuator of FIG. 11.

FIGS. 12-13 illustrate examples of the attenuator 504. The attenuators of FIGS. 12-13 are disclosed in U.S. patent application Ser. No. 11/779,129/Canadian Patent Application No. 2,594,074, which are incorporated herein by reference.

Referring to FIG. 12, a switch-able Pi attenuator unit applicable to the attenuator 504 of FIG. 11 is described. Resistors 901, 902 and 903 make up a Pi attenuator 904. A control signal 907 controls a switch 906, which directs the RF signal through the attenuator 904 when enabled, and through a short circuit 905 when the attenuator is disabled. The RF signal enters the circuit at an input node (line) 908, and leaves the circuit through an output node (line) 909.

In one example, the control signal 907 is controlled based on the output from the register 508 of FIG. 11. In another example, the control signal 907 is controlled by the RFID reader controller 26 of FIG. 1 or the processor 12 of FIG. 1.

The attenuator unit 900 of FIG. 12 includes one attenuator element. However, a plurality of attenuator elements can be connected in series to provide different levels of attenuation. For example, two Pi attenuators may be connected in series as shown in FIG. 12. In FIG. 12, Pi attenuators 1004 and 1005 in an attenuator unit 1000 are connected in series where the attenuator 1004 provides, for example, 3 dB of attenuation, and the attenuator 1005 provides, for example, 6 dB of attenuation. The attenuators 1004 and 1005 are controlled by control signals 1002 and 1003, respectively. When the control signals 1002 and 1003 are used to enable attenuators 1004 and 1005 respectively, the circuit can provide 0 dB, 3 dB, 6 dB or 9 dB of attenuation, depending on the state of the control signals. The RF signal enters the circuit at an input node (line) 1001 and leaves at an output node (line) 1006.

In one example, the control signals 1002 and 1003 are controlled based on the output from the register 508 of FIG. 11. In another example, the control signals 1002 and 1003 are controlled by the RFID reader controller 26 of FIG. 1 or the processor 12 of FIG. 1.

In further example, the RF power output is set to it's minimum setting and then the digitally controlled attenuator (504) is used to attenuate the power output further, resulting in the reduction in power consumption and more accurate control at very low power output. When using the digitally controlled attenuator, the full output power may be generated, but a proportion of this output power is converted to heat by the attenuator, rather than being transmitted.

One or more currently preferred embodiments have been described by way of example. It will be apparent to persons skilled in the art that a number of variations and modifications can be made without departing from the scope of the invention as defined in the claims.

What is claimed is:

1. A portable terminal for an RFID operation comprising:
   a housing including a handle shaped for gripping by a user's hand, the handle having a recess extending toward the inside of the handle;
   an RFID reader for reading an RFID tag;
   a trigger system for operating the read range of the RFID reader,
   the trigger system including:
      a mechanical actuator having a plurality of notches manually movable in the recess and locatable in a plurality of positions by the user gripping the handle, each position being associated with one of the plurality of notches and a different read range of the RFID reader, the RFID reader and the mechanical actuator being mounted in the housing such that the user gripping the handle is capable of locating the mechanical actuator at the plurality of positions to change the read range of the RFID reader and aiming the RFID reader; and
      a sensor system for sensing the position of the actuator to change the read range of the RFID reader based on the position of the actuator, the sensor system including:
         a plurality of mechanical switches formed in the recess and aligned substantially in the longitudinal axis of the recess, the plurality of mechanical switches being associated with the plurality of notches of the actuator such that the switch is activated by mechanical pressure from the actuator when the notch is substantially at least at one of the plurality of positions.

2. A portable terminal as claimed in claim 1, wherein the trigger system comprises:
   a latch system for releasably latching the actuator in a plurality of positions, the plurality of positions being substantially parallel to the longitudinal axis of the recess.

3. A portable terminal as claimed in claim 2, wherein the trigger system comprises:
   a recover system for releasing the actuator from a latched position and returning the actuator to an original position.

4. A portable terminal as claimed in claim 1, wherein the trigger system comprises:
   a feedback system for generating tactile feedback for the user when the actuator is moved.

5. A portable terminal as claimed in claim 1, wherein the actuator comprises:
   a body slidable along a path defined by a slot on the body;
   a spring for moving the body in an original position; and
   a latch connected to the housing and being latched in one of the notches.

6. A portable terminal as claimed in claim 1, wherein each of the plurality of mechanical switches is subsequently closed by the movement of the actuator.

7. A portable terminal as claimed in claim 1, comprising:
   an attenuator for attenuating an RF signal based on the position of the actuator.

8. A portable terminal as claimed in claim 1, comprising:
   an amplifier for amplifying an RF signal, the amount of power supplied to the RF amplifier being changed based on the position of the actuator.

9. A portable terminal as claimed in claim 1, comprising:
   an amplifier for amplifying an RF signal, the amount of RF output power from the amplifier being changed based on the position of the actuator.

10. A portable terminal as claimed in claim 1, comprising:
   a digitally controlled attenuator for attenuation of RF output based on the position of the actuator.

11. A portable terminal as claimed in claim 1, comprising:
   a register for digitally changing the read range of the RFID reader based on the position of the actuator.

12. A portable terminal as claimed in claim 2, wherein the trigger system comprises:
   a counter for counting a current latched position of the actuator from an original position of the actuator, based on the output from the sensor.

13. A portable terminal as claimed in claim 1, comprising:
an indicator for providing to the user an indication associated with the read range of the RFID reader.

14. A portable terminal as claimed in claim 1, wherein the handle forms a pistol grip so that the handle is held by the user and the actuator is operable by the user.

15. A method for an RFID operation, comprising:
sensing a position of a movable mechanical actuator in a portable terminal, the portable terminal including a mechanical actuator having a plurality of notches, a housing having a handle shaped for gripping by a user's hand and a plurality of mechanical switches for sensing the position of the actuator, the handle having a recess extending toward the inside of the handle, the plurality of mechanical switches being formed substantially in the longitudinal axis of the recess of the housing, the actuator being manually movable in the recess and locatable in a plurality of positions by the user gripping the handle, each position being associated with one of the plurality of notches and a different read range of an RFID reader, the RFID reader and the mechanical actuator being mounted in the housing such that the user gripping the handle is capable of locating the mechanical actuator at the plurality of positions and aiming the RFID reader; and changing the read range of the RFID reader based on the position of the actuator, including:

moving the notch substantially at least at one of the plurality of positions; and detecting that at least one of the plurality of mechanical switches is activated by mechanical pressure from the actuator.

16. A portable terminal according to claim 1, comprising:
a read range control system for controlling the read range of the RFID reader based on the position of the actuator.

* * * * *

UNITED STATES PATENT AND TRADEMARK OFFICE
CERTIFICATE OF CORRECTION

PATENT NO.           : 8,174,384 B2  
APPLICATION NO.      : 12/205229  
DATED                : May 8, 2012  
INVENTOR(S)          : Stagg It is certified that error appears in the above-identified patent and that said Letters Patent is hereby corrected as shown below:

In Column 3, Line 2, delete "FIG. 11;" and insert -- FIG. 11. --, therefor.

In Column 4, Line 52, delete "FIG. I" and insert -- FIG. 1 --, therefor.

In Column 6, Line 54, delete "306c,the" and insert -- 306c, the --, therefor.

In Column 8, Line 7, delete "402a,402b" and insert -- 402a, 402b --, therefor.

In Column 8, Line 9, delete "402a,402b" and insert -- 402a, 402b --, therefor.

In Column 8, Line 13, delete "306d.The" and insert -- 306d. The --, therefor.

In Column 8, Line 14, delete "402a,402a" and insert -- 402a, 402b --, therefor.

In Column 8, Line 17, delete "306c.The" and insert -- 306c. The --, therefor.

In Column 8, Line 24, delete "402a,402b" and insert -- 402a, 402b --, therefor.

In Column 8, Line 31, delete "FIG.1) The" and insert -- FIG.1). The --, therefor.

In Column 9, Line 45, delete "it's" and insert -- its --, therefor.

In Column 12, Line 14, in Claim 15, delete "mechanical.......actuator." and insert the same at Line 13 after "activated by".

Signed and Sealed this  
Twenty-sixth Day of March, 2013

Teresa Stanek Rea  
*Acting Director of the United States Patent and Trademark Office*